United States Patent
Asano et al.

(10) Patent No.: US 6,304,405 B1
(45) Date of Patent: Oct. 16, 2001

(54) METHOD AND APPARATUS FOR CONTROLLING READ AND/OR WRITE OPERATIONS OF A DISK DRIVE DEVICE DURING START-UP

(75) Inventors: Hideo Asano; Hiroaki Suzuki, both of Machida (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/115,158

(22) Filed: Jul. 14, 1998

(30) Foreign Application Priority Data

Jul. 14, 1997 (JP) .................................................. 9-188751

(51) Int. Cl.$^7$ .................................................. G11B 15/46
(52) U.S. Cl. .......................................... 360/73.03; 360/53
(58) Field of Search .................................. 360/53, 73.03, 360/71, 73.01

(56) References Cited

U.S. PATENT DOCUMENTS

| | | | |
|---|---|---|---|
| 5,345,347 | * | 9/1994 | Hopkins et al. ........................ 360/71 |
| 5,345,561 | * | 9/1994 | Kato .............................. 360/73.01 X |
| 5,774,292 | * | 6/1998 | Georgiou et al. ................. 360/73.03 |

OTHER PUBLICATIONS

"Plextor PX–43CH Internal CD–ROM Drive/PX–45CH External CD–ROM Drive Operation Manual", p. 48, First Edition, Jun. 1994, Plextor Corp.

* cited by examiner

Primary Examiner—Andrew L. Sniezek
(74) Attorney, Agent, or Firm—Monica D. Lee; Ron Feece

(57) ABSTRACT

A method and apparatus for reducing the amount of time from a power-on status to a ready status of a hard disk drive device. In response to a power-on of a disk drive device, the rotation of a data recording disk is started. The rotational speed of the data recording disk is increased. When it is detected that the rotational speed of the data recording disk reaches an intermediate rotational speed, which is lower than a final rotational speed of the data recording disk, the rotational speed of the data recording disk is fixed at the intermediate rotational speed. One or more control programs recorded on the data recording disk are read and then stored in a memory. Then a ready signal is sent to a host processor. The disk drive device may then receive a read command from the host processor to read data from the data recording disk and to transfer the data to the host processor is detected. The rotational speed of the data recording disk is increased from the intermediate rotational speed to the final rotational speed. A normal read/write operation of the disk drive device begins when it is detected that the data recording disk reaches its final rotational speed.

16 Claims, 8 Drawing Sheets

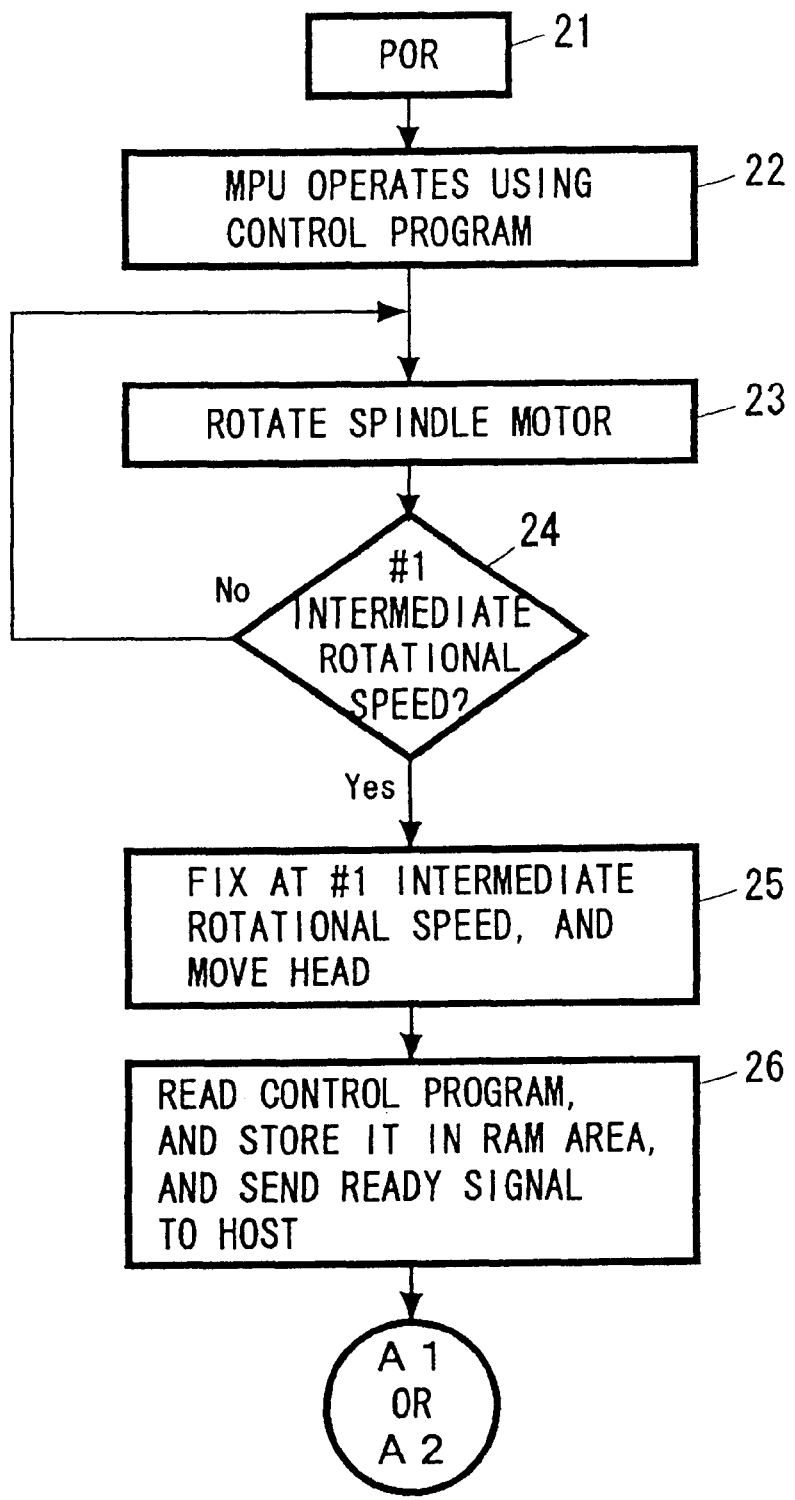
F I G. 3

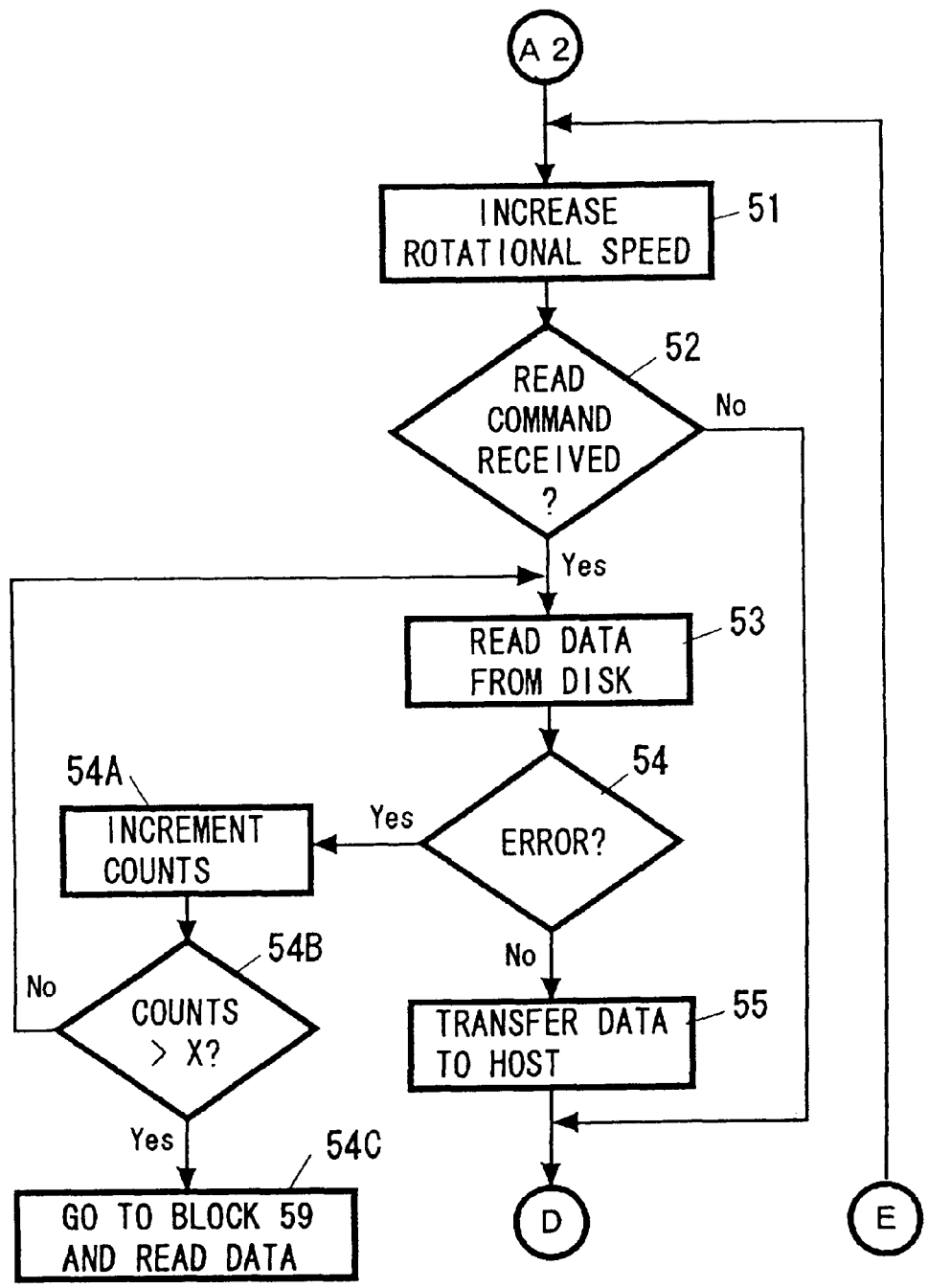
F I G. 7

METHOD AND APPARATUS FOR CONTROLLING READ AND/OR WRITE OPERATIONS OF A DISK DRIVE DEVICE DURING START-UP

BACKGROUND OF THE INVENTION

1. Field of the Invention

The present invention relates to a method and apparatus to reduce the time period from a power on status to a ready status of a hard disk drive device.

2. Description of Related Art

FIG. 1 is a flow chart describing the operation of a conventional hard disk drive device. The operation starts at step 1 in which a power-on reset (POR) operation is performed in response to the power on of the hard disk drive device. At step 2, an MPU contained in the hard disk drive device starts its operation by using control programs stored in its read-only memory (ROM). Next, at step 3, the rotation of a spindle motor which is coupled to a magnetic recording disk is started. Then, at step 4, the MPU determines whether or not the rotational speed of the spindle motor and the magnetic recording disk reach a final rotational speed, for example 7200 rpm. If the final rotational speed is not met, then the operation returns to step 3, otherwise, the operation proceeds to step 5 in which a supporting arm for supporting a head/slider assembly is moved from a rest position to a position above a data track of the magnetic recording disk by a voice coil motor.

Then at step 6 control programs stored in special data tracks (i.e., outside the data tracks used during normal read/write operations) on the magnetic recording disk are read and stored in random access memory (RAM), and the MPU sends a ready signal to a host processor. At step 7, the hard disk drive device waits for a command from the host processor.

The amount of time for a conventional hard disk drive device to perform the steps described in steps 1–6 (i.e., to transition from a power-on status to a ready status) is relatively long, for example 10 seconds. Moreover, the steps described in steps 1–4 require about 90% of the total time to transition from the power-on status to the ready status.

One approach to reduce the time period from the power-on to the start of the ready status is to increase the current applied to the spindle motor. However, this approach raises a problem that a large current is required during the POR. Furthermore, this approach does not sufficiently reduce the time period.

SUMMARY OF THE INVENTION

An object of the present invention is to reduce the amount of time from a power-on status to a ready status of a hard disk drive device.

A method of controlling read and/or write operations of a disk drive device during start-up is described. After power-up, the rotational speed of a data recording disk is increased. When it is detected that the rotational speed of the data recording disk is rotating at a first rotational speed, a control program recorded on the data recording disk is read and then stored in a memory device. Additionally, a ready signal is sent to a host processor. Furthermore, while rotating the data recording disk at the first rotational speed, a read command is received from the host processor to perform a read operation. The rotational speed of the data recording disk is then increased to a second rotational speed. While rotating the data recording disk at the second rotational speed a read operation and/or write operation is performed.

For one aspect of the present invention, when a read command is received from the host processor, data is read from the data recording disk. Furthermore, it is determined whether or not the data read contains an error. If the data read does not contain an error, data is then transferred to the host processor. If the data read does contain an error, the data is reread from the data recording disk when performing the read operation while the data recording disk is rotating at the second rotational speed.

For another aspect of the present invention, while the data recording disk is rotating at the first rotational speed, a write command is received. Write data is then stored in the memory device and a write command completion signal is sent to the host processor. Furthermore, the data stored in the memory device is recorded on the data recording disk while the data recording disk is rotating at the second rotational speed.

A disk drive device is also described. The disk drive device includes a data recording disk and a spindle motor operable to support and rotate the data recording disk. Additionally, the disk drive device includes a head/slider assembly for reading data from and writing data to the data recording disk and a voice coil motor operable to position the head/slider assembly with respect to the data recording disk. The disk drive device also includes a memory device and a control unit. The control unit is operable to read a control program from the data recording disk, store it on the memory device, provide a ready signal to a host processor and perform a read operation while controlling the rotation of the spindle motor at a first rotational speed. If a data error is detected from the read operation, the read operation is retried while controlling the rotation of the spindle motor at a second rotational speed which is faster than the first rotational speed.

For one aspect of the present invention, the control circuit is further operable to store write data from the host processor in the memory device while controlling the rotation of the spindle motor at the first rotational speed.

For another aspect of the present invention, the control circuit is further operable to write the data stored in the memory device onto the data recording disk while controlling the rotation of the spindle motor at the second rotational speed.

Other objects, features, and advantages of the present invention will be apparent from the accompanying drawings and from the detailed description below.

BRIEF DESCRIPTION OF THE DRAWINGS

The present invention is illustrated by way of example and not limitation in the figures of the accompanying drawings, in which like references indicate similar elements, and in which:

FIGS. 3, 4, and 5 show the steps for transitioning a hard disk drive device in accordance with one embodiment of the present invention from a power-on status to a ready status;

FIGS. 7, and 8 show the steps for transitioning a hard disk drive device in accordance with another embodiment of the present invention from a power-on status to a ready status.

DETAILED DESCRIPTION

Figure 2:
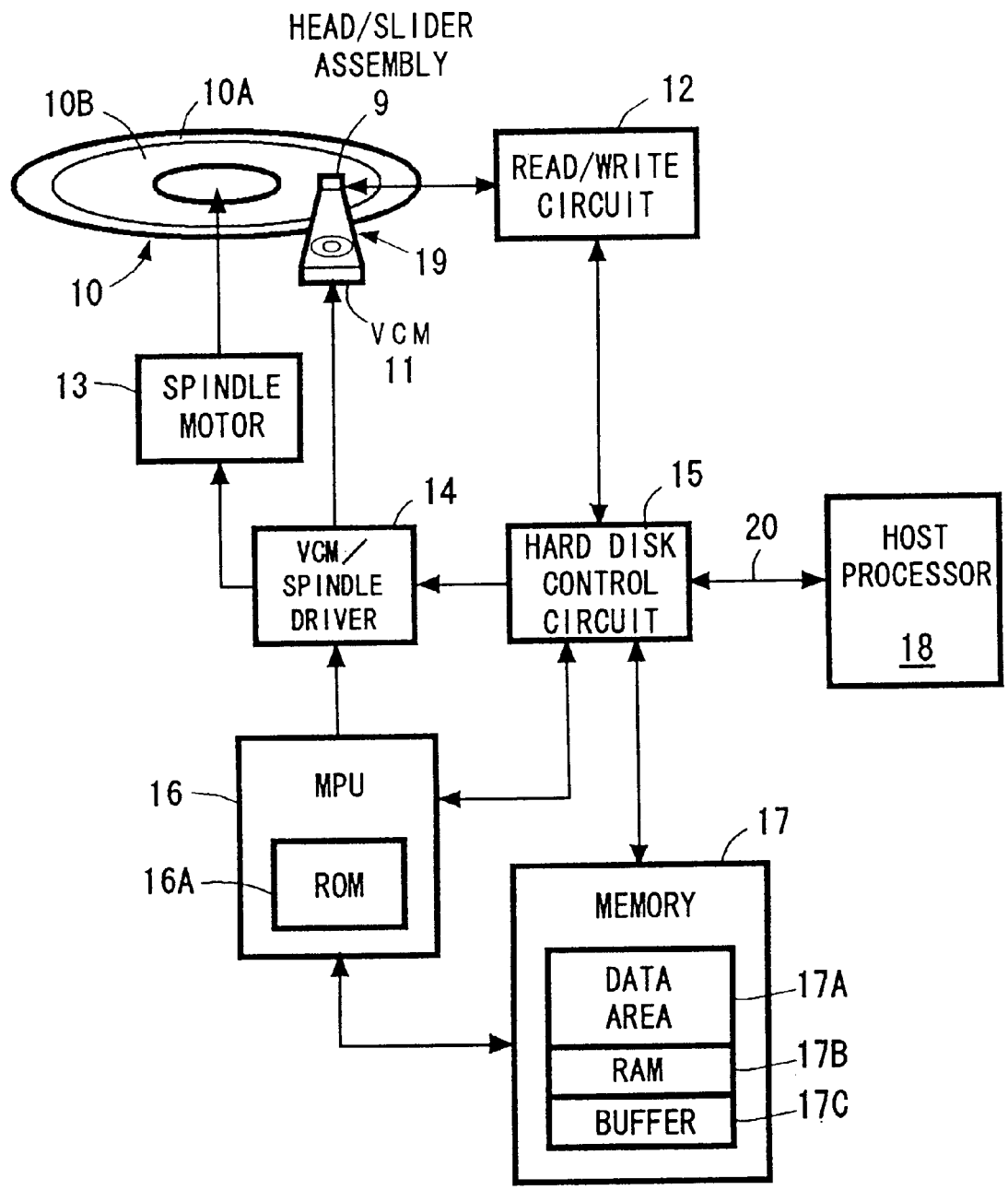
FIG. 2 shows a hard disk drive device in accordance with one embodiment of the present invention.

FIG. 2 shows a block diagram of a hard disk drive device in accordance with one embodiment of the present invention. A recording surface of a magnetic recording disk or a rotating recording disk 10 is divided into an area 10A containing special recording tracks for recording control programs and an area 10B containing data tracks accessed in a normal read/write operation. The magnetic recording disk 10 is rotated by a spindle motor 13. A supporting arm 19 for supporting a head/slider assembly 9 is moved in a radial direction of the magnetic recording disk 10 by a voice coil motor (VCM) 11. The spindle motor 13 and the VCM 11 are controlled by a VCM/spindle driver 14. A read/write circuit 12 is coupled to a head to control the read/write operation of the data. A hard disk control circuit 15 is coupled to the read/write circuit 12, VCM/spindle driver 14 and a memory 17. The memory 17 includes a data area 17A for storing data during a normal read/write operation when the magnetic recording disk 10 is rotated at a designated rotational speed, such as 7200 rpm, which is referred to as a final rotational speed. The memory 17 also includes a RAM area 17B which is used to store the control program down loaded from the special tracks in the area 10A of the magnetic recording disk 10, and a buffer 17C which operates as a cache buffer for storing data sent from a host processor 18 to be subsequently described with respect to block 37 in the FIG. 5 and block 57 in the FIG. 8.

A main control circuit or MPU 16 controls the operation of VCM/spindle driver 14, hard disk control circuit 15 and memory 17. The hard disk control circuit 15 is coupled to host processor 18 through an interface 20.

Figure 4:
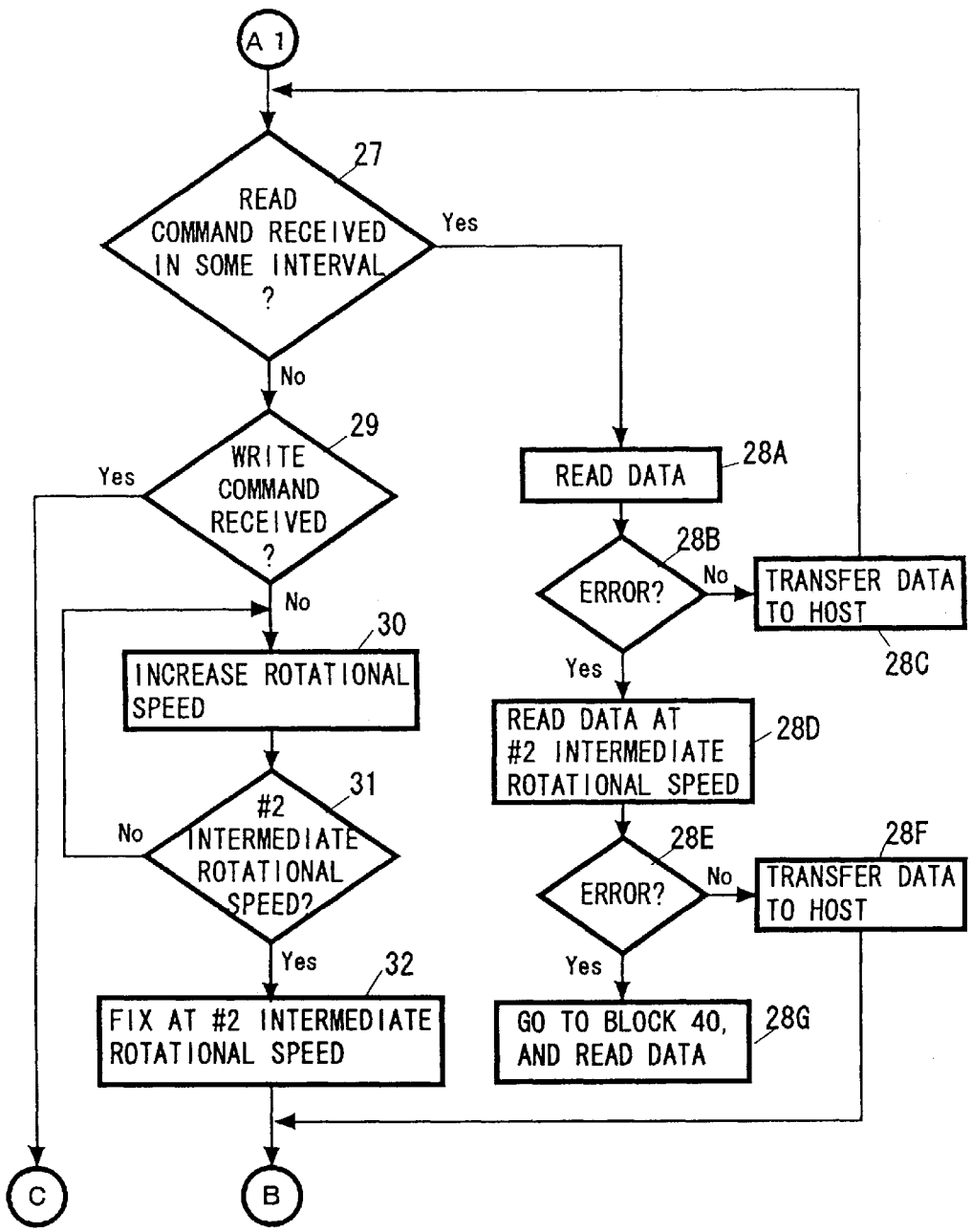
Figure 5:
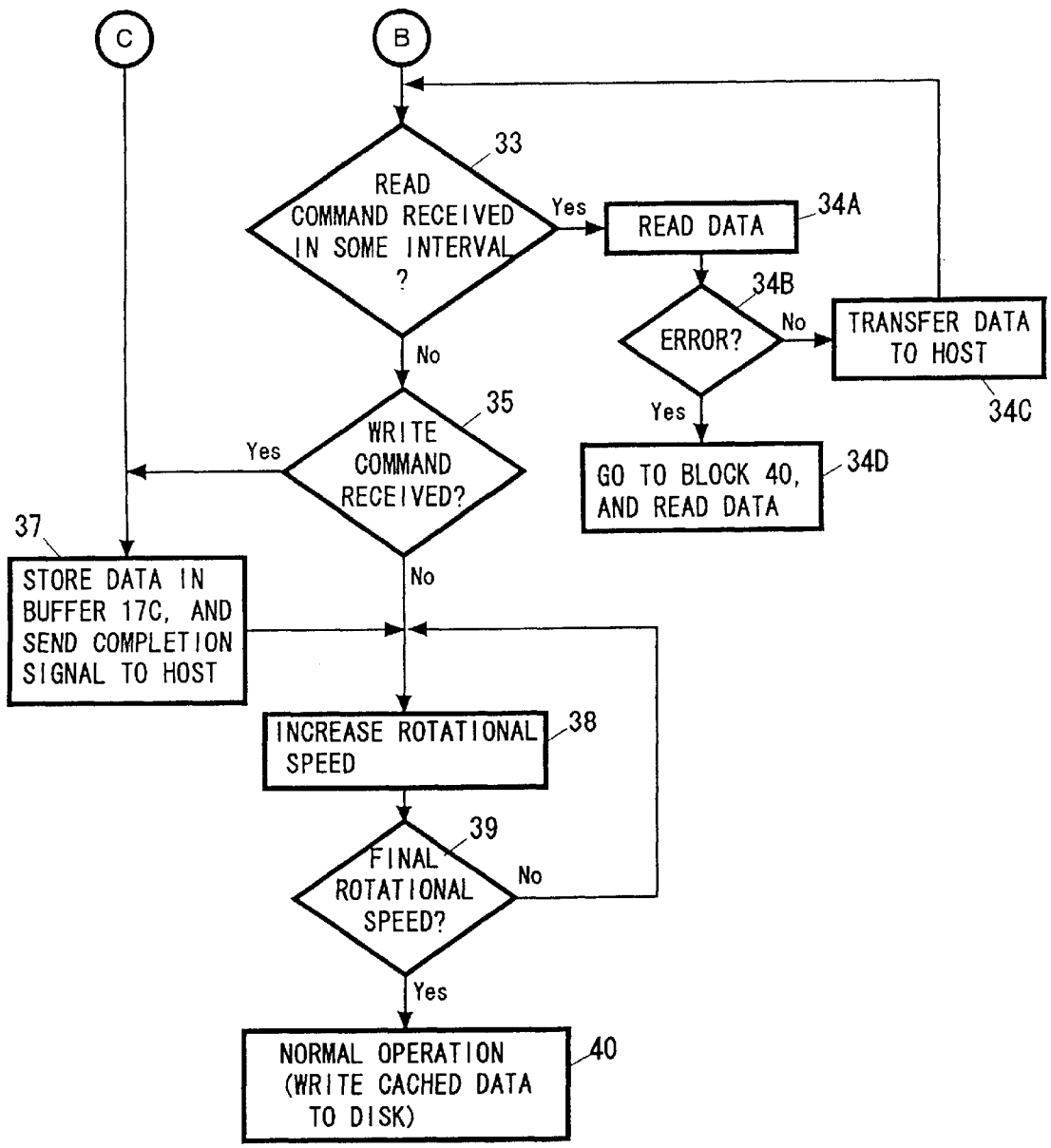

FIGS. 3, 4 and 5 show flow chart for describing the operation of a first embodiment of the present invention controlled by MPU 16. Referring to FIG. 3, the operation starts at step 21. In response to the power-on of the hard disk drive device a power-on-reset (POR) is performed. At step 22, MPU 16 starts its operation by using control programs stored in a ROM (Read Only Memory) 16A in MPU 16. The operation proceeds to step 23 where the rotation of spindle motor 13 is started.

For one embodiment of the present invention, the rotational speed of spindle motor 13 and magnetic recording disk 10 is increased from 0 rpm to 7200 rpm. Note that for this embodiment, 7200 represents the final rotational speed. At a rotational speed of 2700 rpm, head/slider assembly 9 starts to fly above the surface of magnetic recording disk 10. The following two intermediate rotational speeds may be selected:
4500 rpm A first intermediate rotational speed
5400 rpm A second intermediate rotational speed The first intermediate rotational speed (e.g., 4500 rpm) is selected because at this speed of the data recorded on the disk 10 can be read.

Returning to FIG. 3, the operation proceeds to step 24 in which MPU 16 determines whether or not the rotational speed of spindle motor 13 and magnetic recording disk 10 reaches the first intermediate rotational speed, e.g., 4500 rpm. If the answer to step 24 is "NO", the operation returns to step 23. If the answer to step 24 is "YES", the operation proceeds to a step 25 in which MPU 16 and VCM/spindle driver 14 fix the rotational speed of disk 10 at the first intermediate rotational speed (4500 rpm), and MPU 16 and VCM/spindle driver 14 control VCM 11 to move the supporting arm 19 for supporting head/slider assembly 9 from a rest position to a position above the special recording tracks in area 10A.

The detection of the rotational speed of spindle motor 13 is described below. The spindle motor 13 is a three phase AC motor. When the three phase spindle motor 13 is rotated by drive pulses, not shown, applied by VCM/spindle driver 14, a pulse train induced by the rotation of the three phase coils of spindle motor 13 synchronous with the rotational speed is detected by a detecting device, not shown in the drawing. The detecting device supplies the pulse train to the 16. The MPU 16 monitors the pulse train to determine the rotational speed of spindle motor 13.

The operation proceeds to step 26 in which MPU 16 reads one or more control programs recorded in the special data tracks in area 10A on magnetic recording disk 10 and stores them in a RAM 17B of memory 17. The MPU 16 sends a ready signal to host processor 18.

It should be noted that typically a portion of the control program used for starting the operation of MPU 16 and for starting the rotation of spindle motor 13 is stored in ROM 16A, and the remaining portion of the control program is stored in the special data tracks in area 10A. The control programs stored in the special data tracks are down loaded to RAM 17B in memory 17, as described before.

The operation proceeds to step 27 in FIG. 4 in which MPU 16 determines whether or not a read command from host processor 18 is received within some interval, for example a 1 second interval. If the answer to step 27 is "YES", the operation proceeds to step 28A in which data specified by the read command is read from the magnetic recording disk 10. The operation proceeds to step 28B in which MPU 16 determines whether or not the read data contains an error. If the answer to step 28B is "NO", the operation proceeds to step 28C in which the read data is transferred to host processor 18 through interface 20. If the answer to step 28B is "YES", then the data read at the first rotational speed (e.g., 4500 rpm) contains an error, and the operation proceeds to step 28D in which MPU 16 increases the rotational speed of disk 10 to the second intermediate rotational speed (e.g., 5400 rpm). The operation proceeds to step 28E in which MPU 16 determines whether or not the read data contains an error. If the answer to step 28E is "NO", the operation proceeds to step 28F in which the read data is transferred to host processor 18 through interface 20. If the answer to step 28E is "YES", then the data read at the second rotational speed (e.g., 5400 rpm) contains an error, and the operation proceeds to step 28G in which the operation proceeds to step 40, and the read operation of the data is retried during the normal read/write operation (e.g., 7200 rpm).

If the answer to step 27 is "NO", the operation proceeds to step 29 in which MPU 16 determines whether or not a write command from host processor 18 is received. If the answer to step 29 is "YES", the operation proceeds to step 37 in which MPU 16 temporarily stores or caches the data sent from host processor 18 in buffer 17C of memory 17, and sends back a command completion signal to host processor 18. The operation then proceeds to step 38 to be subsequently described below.

If the answer to step 29 is "NO", the operation proceeds to step 30 in which MPU 16 and VCM/spindle driver 14 increase the rotational speed of disk 10, now at the first intermediate rotational speed (e.g., 4500 rpm).

The operation proceeds to step 31 in which MPU 16 determines whether or not the rotational speed of disk 10 reaches the second rotational speed (e.g., 5400 rpm). If the answer to step 31 is "NO", the operation returns to step 30. If the answer to step 31 is "YES", the operation proceeds to step 32 in which MPU 16 and VCM/spindle driver 14 fix the rotational speed of disk 10 at the second rotational speed (e.g., 5400 rpm).

The operation proceeds to step 33 shown in FIG. 5 in which MPU 16 determines whether or not a read command from host processor 18 is received within some interval, for example, a 1 second interval.

If the answer to step 33 is "YES", the operation proceeds to step 34A in which data specified by the read command is read from magnetic recording disk 10. The operation proceeds to step 34B in which MPU 16 determines whether or not the read data contains an error. If the answer to step 34B is "NO", the operation proceeds to step 34C in which the read data is transferred to host processor 18 through interface 20. If the answer to step 34B is "YES", then the data read at the second intermediate rotational speed (e.g., 5400 rpm) contains an error, and the operation proceeds to step 34D in which the operation proceeds to step 40 and MPU 16 retries the read operation based upon the current read command in the normal read/write operation. It indicates that if the data read at the second intermediate rotational speed (e.g., 5400 rpm) contains an error, the read operation is retried during the normal read/write operation at which disk 10 is rotated at the final rotational speed (e.g., 7200 rpm).

If the answer to step 33 is "NO", the operation proceeds to step 35 in which MPU 16 determines whether or not a write command from host processor 18 is received. If the answer to step 35 is "YES", the operation proceeds to step 37 in which MPU 16 temporarily stores the data sent from host processor 18 in buffer 17C of memory 17, and sends back a command completion signal to host processor 18. The operation proceeds to block 38 in which MPU 16 and VCM/spindle driver 14 increase the rotational speed of disk 10, now at the second intermediate rotational speed (e.g., 5400 rpm) toward the normal or final rotational speed (e.g., 7200 rpm). The operation proceeds to step 39 in which MPU 16 determines whether or not the rotational speed of disk 10 reaches the final rotational speed (e.g., 7200 rpm). If the answer to step 39 is "NO", the operation returns back to the step 38. If the answer to step 39 is "YES", the operation proceeds to step 40 in which the normal read/write operation at the normal or final rotational speed (e.g., 7200 rpm) is started.

If the data is stored in buffer 17C as specified in step 37, the write operation of the cached data in the buffer 17C is performed during the normal read/write operation.

Figure 1:
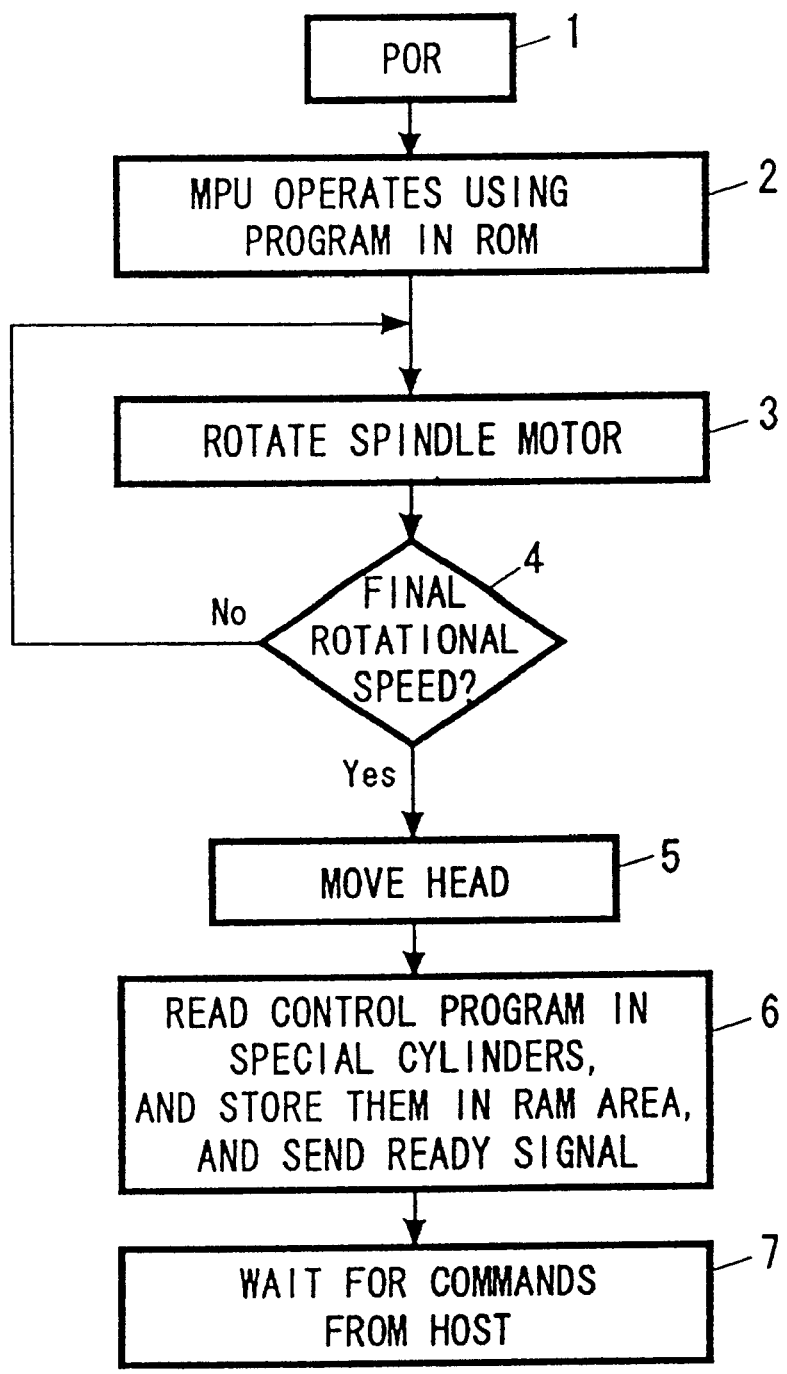
FIG. 1 shows the steps for transitioning a conventional hard disk drive device from a power-on status to a ready status.
Figure 6A:
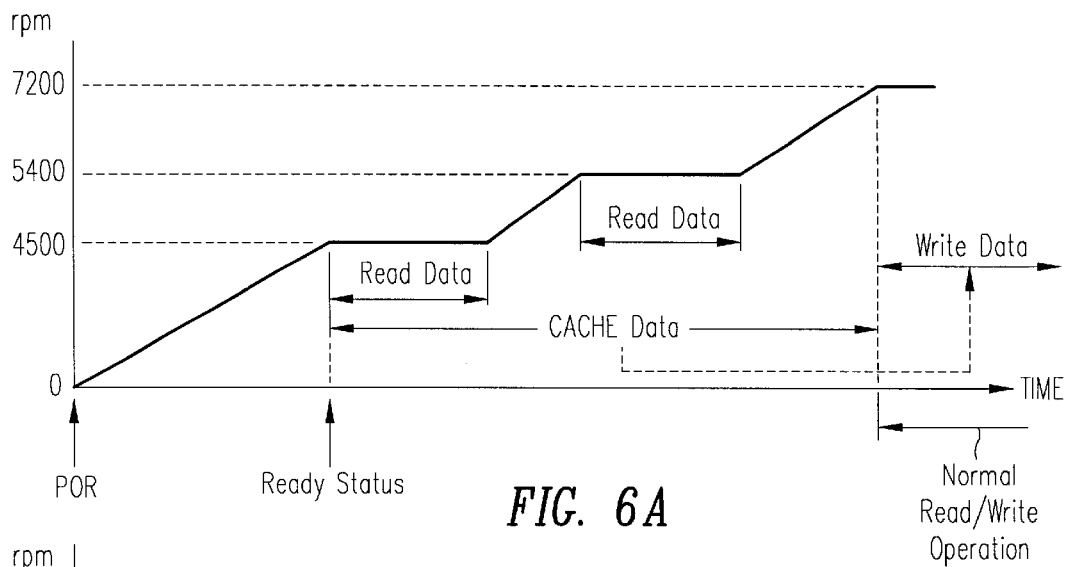
FIG. 6A shows a timing diagram for transitioning a hard disk drive device in accordance with one embodiment of the present invention from a power-on status to a ready status.
Figure 6B:
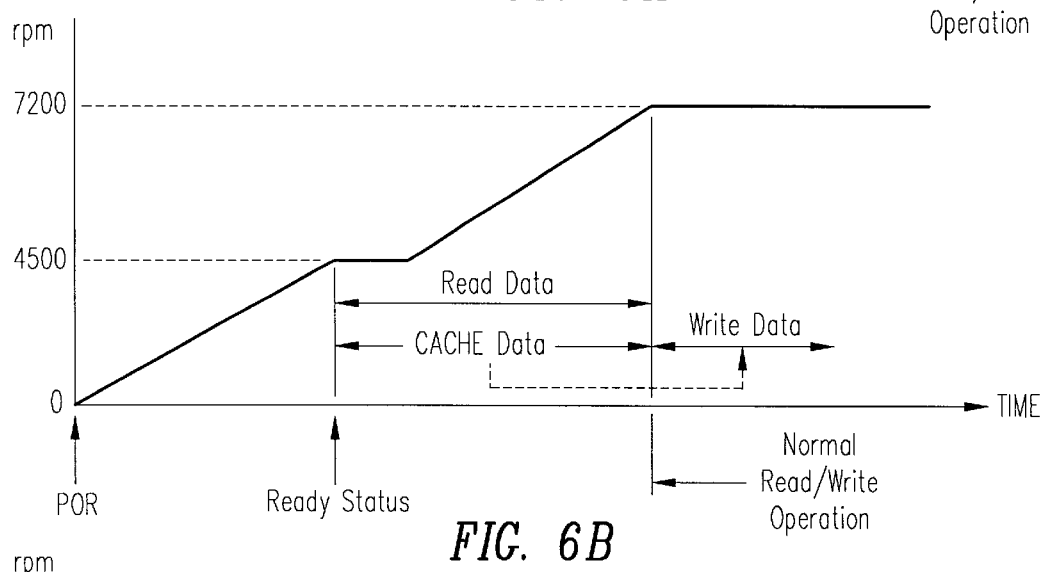
FIG. 6B shows a timing diagram for transitioning a hard disk drive device in accordance with another embodiment of the present invention from a power-on status to a ready status.
Figure 6C:
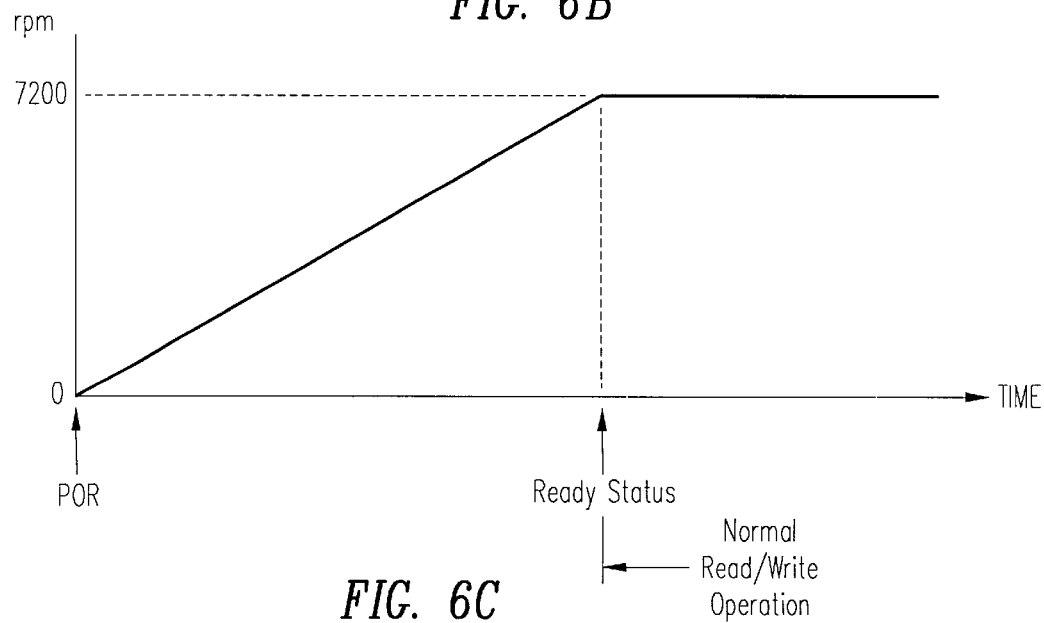
FIG. 6C shows a timing diagram for transitioning the conventional hard disk drive device from a power-on status to a ready status.

FIG. 6(A) shows the timing diagram of the operational sequences of the first embodiment of the present invention described with reference to FIGS. 3, 4, and 5; FIG. 6(B) shows the timing diagram of the operational sequence of the second embodiment of the present invention, to be subsequently described with reference to FIGS. 3, 7 and 8; and FIG. 6(C) shows the timing diagram of the operational sequence of the conventional hard disk drive described with reference to FIG. 1.

According to FIG. 6(A) and FIG. 6(B), when the write command and the data from host processor 18 are received during a period between the start of the ready status and the start of the normal read/write operation, MPU 16 sends the command completion signal to host processor 18, but the data is stored or cached in buffer 17C, and the actual write operation of the data to disk 10 is not performed during this period. The actual write operation of the data is performed during the normal read/write operation in which disk 10 is rotated at the final rotational speed (e.g., 7200 rpm).

It should be noted that the hard disk drive device is generally designed to write data at the final rotational speed (e.g., 7200 rpm) and to read data at the final rotational speed. Accordingly, a probability of an error while reading, at the final rotational speed (e.g., 7200 rpm), the data which is written at the final rotational speed (e.g., 7200 rpm) is relatively low, while a probability of an error while reading, at the normal rotational speed (e.g., 7200 rpm), the data which is written at the intermediate rotational speed (e.g., 4500 rpm or 5400 rpm) is remarkably high. Therefore, the actual write operation is not performed before the normal read/write operation.

In contrast to the write operation, the read operation requested by the read command received during the period between the start of the ready status and the start of the normal read/write operation is performed during the period at which disk 10 is rotated at the intermediate rotational speed (e.g., 4500 rpm or 5400 rpm).

The read operation is performed before the normal read/write operation for the following reason. Because the hard disk drive device is generally designed to write the data at the final rotational speed (e.g., 7200 rpm) and to read the data at the final rotational speed, an error may occur when the data is read from disk 10 at the intermediate rotational speed (e.g., 4500 rpm or 5400 rpm). As described above, however, one or more chances for retrying the read operation is provided in the present invention. More particularly, even if an error is detected in step 28B during the read operation performed at the first intermediate rotational speed (e.g., 4500 rpm), the read operation can be retried at the next rotational speed, (e.g., 5400 rpm). Additionally, if an error is also detected at step 34B during the read operation at the next rotational speed (e.g., 5400 rpm), the read operation can be retried at the next rotational speed, for example the final rotational speed (e.g., 7200 rpm) during the normal read/write operation. It is apparent that the higher the rotational speed of disk 10, the lower the probability of an error occurring. Therefore, the recovery of an error that occurred in the read operation performed at the intermediate rotational speed is practical in view of the operation of the hard disk drive device, while the recovery of an error in the read operation by decreasing the rotational speed with respect to the data written at the intermediate rotational speed is not practical in view of the operation of the hard disk drive device.

FIG. 6 shows that the time periods from the power-on status to the start of the ready status in the first and second embodiments of the present invention shown in FIGS. 6(A) and 6(B), respectively, is substantially reduced in comparison with that in the conventional disk drive device shown in FIG. 6(C).

Figure 8:
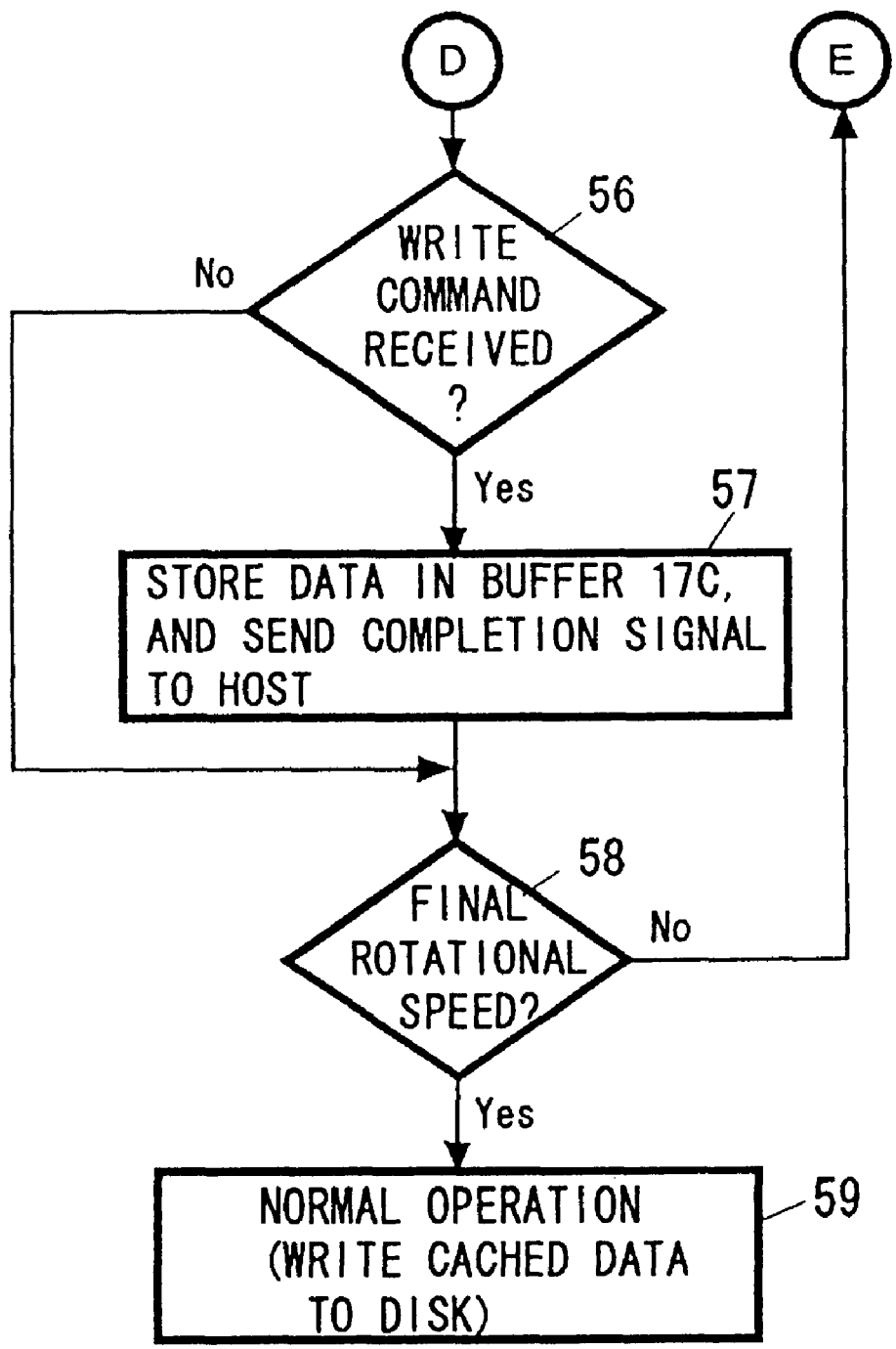

FIGS. 3, 7 and 8 show a flow chart for describing the operation of the second embodiment of the present invention controlled by MPU 16. Step 26 shown in FIG. 3 is followed by step 51 shown in FIG. 7 in which MPU 16 and VCM/spindle driver 14 increase the rotational speed of disk 10 now rotated at the first intermediate rotational speed (e.g., 4500 rpm) toward the final rotational speed (e.g., 7200 rpm). The operation proceeds to step 52 in which MPU 16 determines whether or not the read command from the host processor is received. If the answer to step 52 is "NO", the operation proceeds to step 56 shown in FIG. 8. If the answer to step 52 is "YES", the operation proceeds to step 53 in which the data is read from disk 10. The operation proceeds to step 54 in which MPU 16 determines whether or not the data contains an error.

If the answer to step 54 is "NO", the operation proceeds to step 55 in which the data is transferred to host processor 18. If the answer to step 54 is "YES", the operation proceeds to step 54A in which a count value indicating the number of occurrence of the answer "YES" from step 54 is incremented. It is noted that the count value in step 54A is reset to zero during step 21 shown in the FIG. 3.

The operation proceeds to step 54B in which MPU 16 determines whether or not the count value of step 54A exceeds a predetermined value "X". If the answer to step 54B is "NO", the operation returns to step 53. If the answer to step 54B is "YES", the operation proceeds to step 54C in which the operation proceeds to step 59, and MPU 16 retries the read operation based upon the current read command in the normal read/write operation. It indicates that if the data read during the increase of the rotational speed of disk 10 contains an error, the read operation is retried during the normal read/write operation at which the disk 10 is rotated at the final rotational speed (e.g., 7200 rpm).

After the data has been sent to host processor 18 in step 55, the operation proceeds to step 56 shown in FIG. 8 in which MPU 16 determines whether or not a write command from the host processor 18 is received. If the answer to step 56 is "YES", the operation proceeds to step 57 in which MPU 16 temporarily stores or caches the data sent from host processor 18 in buffer 17C of memory 17, and sends back a command completion signal to host processor 18.

The operation proceeds to step 58. If the answer to step 56 is "NO", the operation also proceeds to step 58 in which MPU 16 determines whether or not the rotational speed of disk 10 reaches the final rotational speed (e.g., 7200 rpm). If the answer to step 58 is "NO", the operation returns to step 51. If the answer to step 58 is "YES", the operation proceeds to step 59 in which the normal read/write operation at the final rotational speed (e.g., 7200 rpm) is started. If the data is stored in buffer 17C specified in step 57, the write operation of the cached data in buffer 17C is performed during the normal read/write operation.

To increase the capability of correcting the error in data which is read during the gradual increase of the rotational speed of disk 10 from the rotational speed of the 4500 rpm in the second embodiment of the present invention, a single bit of data can be represented by a plurality of bits. For example, a bit "1" is represented by a plurality of bits, such as three bits "111". Another way for increasing the capability of the error correction is to increase the number of error correction bits attached to the data bits.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method of controlling read and/or write operations of a disk drive device during start-up, said method comprising the steps of:

(a) increasing a rotational speed of a data recording disk after power-on of said disk drive device;

(b) detecting that said rotational speed of said data recording disk is rotating at a first rotational speed;

(c) while rotating said data recording disk at said first rotational speed, reading a control program recorded on said data recording disk, storing said control program in a memory device, and sending a ready signal to a host processor;

(d) while rotating said data recording disk at said first rotational speed, receiving a read command from said host processor to perform a read operation for reading data from said data recording disk;

(e) increasing said rotational speed of said data recording disk to a second rotational speed, wherein said second rotational speed is faster than said first rotational speed; and (f) while rotating said data recording disk at said second rotational speed, performing a read operation and/or write operation.

2. The method of claim 1, wherein step (d) comprises the steps of:

(i) reading said data from said data recording disk;

(ii) determining whether or not said data read from said data recording disk contains an error;

(iii) if said data read from said data recording disk does not contain an error, transferring said data to said host processor; and (iv) if said data read from said data recording disk contains an error, rereading said data from data recording disk during said read operation performed during step (f).

3. The method of claim 2, wherein said first rotational speed represents a first intermediate speed and said second rotational speed represents a final rotational speed of said disk drive device.

4. The method of claim 1, further comprising, between steps (d) and (e), the steps of:

(g) increasing said rotational speed of said data recording disk to a third rotational speed, wherein said third rotational speed is faster than said first rotational speed and slower than said second rotational speed; and (h) while rotating said data recording disk at said third rotational speed, receiving a read command from said host processor to perform said read operation for reading data from said data recording disk.

5. The method of claim 4, wherein said first rotational speed represents a first intermediate speed, said second rotational speed represents a final rotational speed, and said third rotational speed represents a second intermediate speed of said disk drive device.

6. The method of claim 4, wherein step (d) comprises the steps of:

(i) reading said data from said data recording disk;

(ii) determining whether or not said data read from said data recording disk contains an error;

(iii) if said data read from said data recording disk does not contain an error, transferring said data to said host processor; and (iv) if said data read from said data recording disk contains an error, rereading said data from data recording disk during said read operation performed during step (h).

7. The method of claim 6, wherein step (h) comprises the steps of:

(i) reading said data from said data recording disk;

(ii) determining whether or not said data read from said data recording disk contains an error;

(iii) if said data read from said data recording disk does not contain an error, transferring said data to said host processor; and (iv) if said data read from said data recording disk contains an error, rereading said data from data recording disk during said read operation performed during step (f).

8. The method of claim 1, further comprising after step (c) and before step (e), the step of while rotating said data recording disk at said first rotational speed, receiving a write command from said host processor to perform a write operation for writing data received from said host processor to said data recording disk, storing said data received from said host processor in a memory device, and sending a write command completion signal to said host processor, and wherein step (f) further comprises the step of while rotating said data recording disk at said second rotational speed, writing said data stored in said memory device to said data recording disk.

9. The method of claim 8, wherein step (d) comprises the steps of:
   (i) reading said data from said data recording disk;
   (ii) determining whether or not said data read from said data recording disk contains an error;
   (iii) if said data read from said data recording disk does not contain an error, transferring said data to said host processor; and
   (iv) if said data read from said data recording disk contains an error, rereading said data from data recording disk during said read operation performed during step (f).

10. A method of controlling read and/or write operations of a disk drive device during start-up, said method comprising the steps of:
    (a) increasing a rotational speed of a data recording disk after power-on of said disk drive device;
    (b) detecting that said rotational speed of said data recording disk is rotating at a first rotational speed;
    (c) while rotating said data recording disk at said first rotational speed, reading a control program recorded on said data recording disk, storing said control program in a first memory device, and sending a ready signal to a host processor;
    (d) while rotating said data recording disk at said first rotational speed, receiving a write command from said host processor to perform a write operation for writing data received from said host processor to said data recording disk, storing said data received from said host processor in a second memory device, and sending a write command completion signal to said host processor;
    (e) increasing said rotational speed of said data recording disk to a second rotational speed, wherein said second rotational speed is faster than said first rotational speed; and
    (f) while rotating said data recording disk at said second rotational speed, writing said data stored in said second memory device to said data recording disk.

11. A method as set forth in claim 10 wherein said first and second memories are integral one with another.

12. A disk drive device, comprising:
    a data recording disk;
    a spindle motor operable to support and rotate said data recording disk;
    a head/slider assembly for reading data from and writing data to said data recording disk;
    a voice coil motor operable to position said head/slider assembly with respect said data recording disk;
    a memory device;
    a control circuit coupled to said spindle motor, said voice coil motor, and said memory device, said control circuit operable to process a control program read from said data recording disk, store it on said memory device, provide a ready signal to a host processor, and process data read from said data recording disk while controlling the rotation of said spindle motor at a first rotational speed, if a data error is detected, said data is read again while controlling the rotation of said spindle motor at a second rotational speed which is faster than said first rotational speed.

13. The disk drive device of claim 12, wherein said control circuit is further operable to store write data from said host processor in said memory device while controlling the rotation of said spindle motor at said first rotational speed, and writing said data stored in said memory device to said data recording disk while controlling the rotation of said spindle motor at said second rotational speed.

14. A control circuit for a disk drive device, comprising:
    means for increasing a rotational speed of a data recording disk after power-on of said disk drive device;
    means for detecting that said rotational speed of said data recording disk is rotating at a first rotational speed;
    means for reading a control program recorded on said data recording disk, storing said control program in a memory device, and sending a ready signal to a host processor while rotating said data recording disk at said first rotational speed;
    means for receiving a read command from said host processor to perform a read operation for reading data from said data recording disk while rotating said data recording disk at said first rotational speed;
    means for increasing said rotational speed of said data recording disk to a second rotational speed, wherein said second rotational speed is faster than said first rotational speed; and
    means for performing a read operation and/or write operation while rotating said data recording disk at said second rotational speed.

15. The control circuit of claim 14, wherein means for receiving a read command from said host processor includes means for reading said data from said data recording disk, means for determining whether or not said data read from said data recording disk contains an error, means for transferring said data to said host processor when said data read from said data recording disk does not contain an error, and wherein means for performing said read operation and/or write operation includes means for rereading said data from data recording disk during said read operation performed when said data read from said data recording disk contains an error.

16. The control circuit of claim 14, further including means for storing write data from said host processor in said memory device while controlling the rotation of said spindle motor at said first rotational speed, and wherein said means for performing said read operation and/or write operation includes means for writing said data stored in said memory device to said data recording disk while controlling the rotation of said spindle motor at said second rotational speed.

* * * * *